May 14, 1935.  H. E. PUMPHREY  2,001,396
HEADREST FOR MOTOR VEHICLES
Filed July 13, 1934
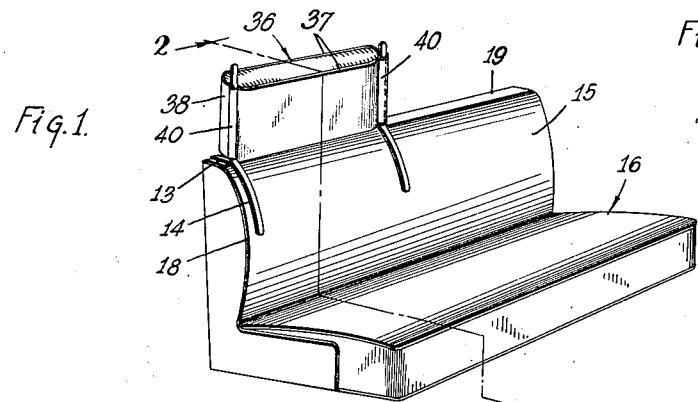
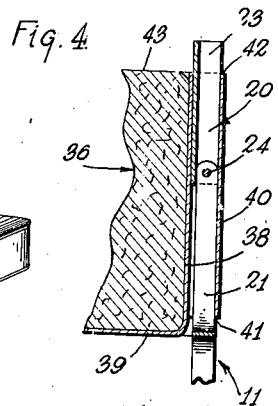
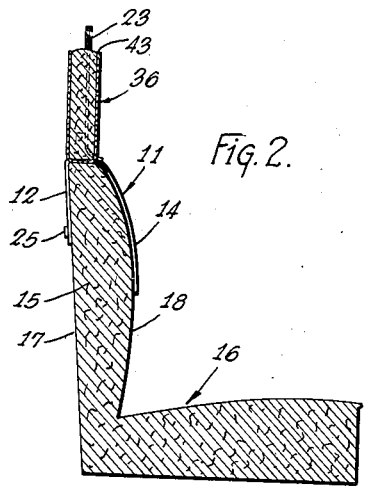
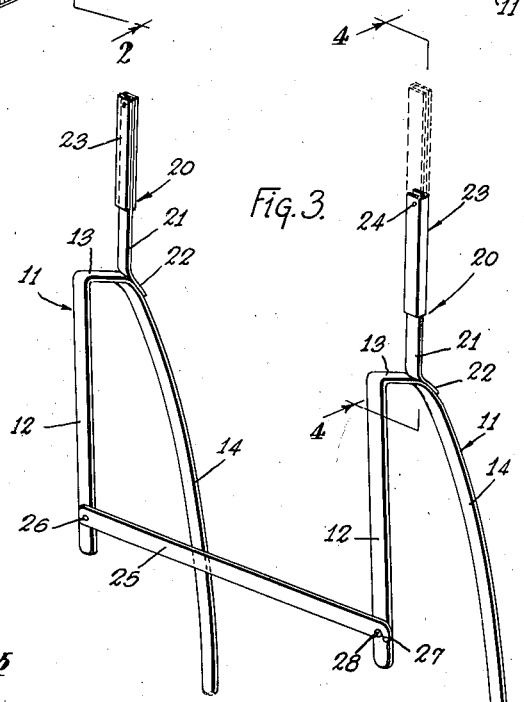
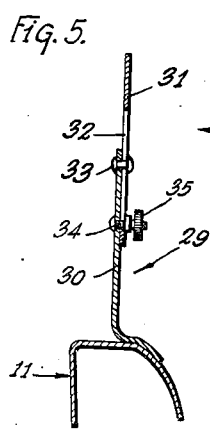
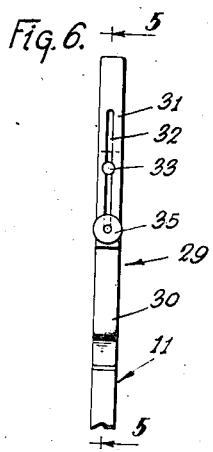
Inventor
H. E. Pumphrey
by
Hazard and Miller
Attorneys.

Patented May 14, 1935

2,001,396

UNITED STATES PATENT OFFICE 2,001,396

HEADREST FOR MOTOR VEHICLES

Harry E. Pumphrey, Pasadena, Calif.

Application July 13, 1934, Serial No. 734,934

3 Claims. (Cl. 155—174)

My invention relates to a device for forming a headrest which may be attached to a seat of an automobile and form a retention means for a pillow, or the like, above the top of the back of the seat.

An object and feature of my invention is a pair of clamp-like structures which may be attached to the back of an automobile seat and which have means for supporting a pillow on the top edge of the seat back so that a person may recline his head against such pillow or cushion. The claims are designed to be readily attached and detached from the seat back so that if the headrest is not required it will not mar the appearance of the automobile seat.

A further object and feature of my invention is forming the clamps of resilient metal, each clamp having a rear and front strap to engage the back and the front of a seat back with a portion of a clamp extending over the upper edge of the seat back, the straps forming a clamp each formed of spring metal and tensioned so that they have a natural springiness to snugly engage the back of the seat.

Another object and feature of my invention is providing a post construction or an upright device which may be utilized to uphold the pillow supporter, and this structure for holding the pillow is preferably made in the form of a sack with pockets in each end through which the posts are inserted and an ordinary pillow may be inserted in the sack.

A further detailed feature is forming the post adjustable in height which may be done by having an upper section hinged to the lower section or having the upper sections slidably mounted on the lower section.

Another detailed feature relates to the use of a spacing bar to space the clamps the correct distance apart, this bar extending horizontally along the rear of the seat back.

My invention is illustrated in connection with the accompanying drawing, in which:

Fig. 1 is a perspective view with my invention attached to the back of a seat.

Fig. 2 is a vertical section on the line 2—2 of Fig. 1 in the direction of the arrows.

Fig. 3 is a perspective view of the clamps, post and spacing bar separated from the seat and omitting the sack.

Fig. 4 is a detailed section on the line 4—4 of Fig. 3 showing the manner of adjusting the height of the post and retaining the sack on the post.

Fig. 5 is a vertical section of a modification on the line 5—5 of Fig. 6 in the direction of the arrows showing a slidable adjusting post.

Fig. 6 is a front elevation of a modification taken in the direction of the arrow 6 of Fig. 5.

In my invention I employ two metal clamps 11. Each clamp has a back strap 12, a top piece 13 and a curved front strap 14, the front strap being preferably considerably longer than the back strap. These are formed of resilient metal and are so tensioned that the back and front straps tend to spring together. These straps are so shaped as to fit on the back 15 of a seat 16. In most front seats for automobiles, or the like, the rear of the front back 17 is a plane surface and the front portion 18 of the seat back is curved in a somewhat convex manner considered in a vertical section. Therefore, the straight back strap 12 fits snugly against the rear surface 17 of the seat back and the curved strap 14 is designed to conform somewhat to the convex curve 18 of the front portion of the seat back. The top piece 13 is designed to rest on the upper edge 19 of the seat back.

Each of the clamps is provided with a post structure 20. In the type illustrated in Figs. 3 and 4 the post has a lower metal strap section 21 welded or otherwise secured at 22 to the clamp preferably approximately at the corner formed by the top piece 13 of the front strap 14. The post has an upper or hinged portion 23 which is formed U-shaped in cross section and has a pivot pin 24 adjacent the top of the lower section 21. By this construction the U-shaped section 23 may have its long part extending downwardly from the pivot pin and thus partly encircle the portion 21 from one side but when it is tilted upwardly to the dotted position of Fig. 3 and full line position of Fig. 4, it forms an upward extension, the bottom of the U abutting against the opposite side of the lower section 21.

In order to space the clamps the proper distance apart a spacing bar 25 is pivoted at 26 to one of the back straps 12 of the clamp and has a hook 27 engaging a pin 28 on the other back strap as shown in Fig. 3. This maintains the clamps the desired distance apart on the back of the seat.

In the construction of Figs. 5 and 6 the post 29 is illustrated as having a lower section 30 welded or otherwise secured to the clamp and is provided with an upper sliding section 31 which has the longitudinal slot 32 riding on the guide rivet 33, and the clamp screw 34 having a clamp nut 35. By this arrangement the upper section 31 may be raised and lowered with reference to the lower section 30 and maintained in adjusted positions.

With the clamps and posts I employ a fabric sack 36 which is illustrated as having opposite sides 37, ends 38, and a bottom 39, and at the ends there are vertical pockets 40 open at both the bottom 41 and the top 42. The sack has an open top as indicated at 43.

In the manner of using my invention as shown in Fig. 1, the clamps are secured on the seat back the desired distance apart as regulated by the spacing bar and on account of the resiliency of the metal of the clamps they are readily retained in position on the back of the seat. When the folding post of the construction of Figs. 3 and 4 is used, the folding section is aligned with the lower section as indicated dotted in Fig. 3 and in full lines in Fig. 4, the pocket of the sack being inserted over the post. Thus the sack is held at its opposite ends, and has the bottom 39 resting on the top edge 19 of the seat back. In this sack a person may place an ordinary pillow or cushion and thus secure a soft headrest.

When using the construction of Figs. 5 and 6 the post may be adjusted to the length of the pockets and the pockets fitted over the post, the clamp screws and the clamp nuts, and then the pillow used in the sack. It will be noticed that if desired, the sack may be made in the form of a pillow or cushion.

Various changes may be made in the principles of my invention without departing from the spirit thereof, as set forth in the description, drawing and claims.

I claim:

1. In a device as described, a pair of clamps each having a rear and a front strap connected by a top piece, said straps being resilient and tensioned to resist spreading, said straps being adapted to engage the rear and front face, and the top edge of a seat back, a spacing means for the clamp, each clamp having a vertical post adjacent its top, and a headrest device secured to each post, each post having a lower section and an upper section U-shaped in cross section pivoted to the upper end of the lower section, the U-shaped section being adapted to encase part of the lower section or to be turned upwardly into alignment therewith.

2. In a device as described, a sack having front, back and end walls, and a bottom, and open at the top, vertical pockets at the ends, and means fitting in said pockets adapted to secure the sack on a seat back with the bottom resting on the upper edge of the seat back.

3. In a device as described, a sack having sides, ends and a bottom and open at the top, a vertical pocket attached to each end, a vertical post in each pocket, and means to attach the post to a seat back to position the bottom of the sack resting on the upper edge of the seat back.

HARRY E. PUMPHREY.